March 13, 1962 R. W. SIMS 3,024,930
PORTABLE STORAGE AND DISPENSING SILO FOR BULK DRY CEMENT
Filed Oct. 28, 1957 5 Sheets-Sheet 1
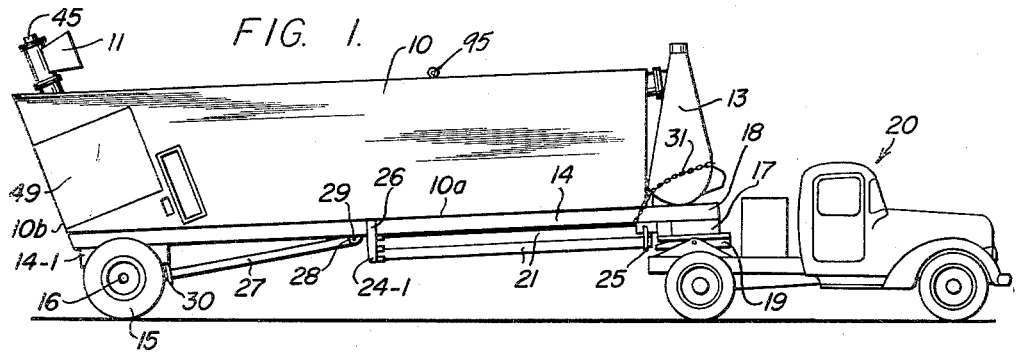
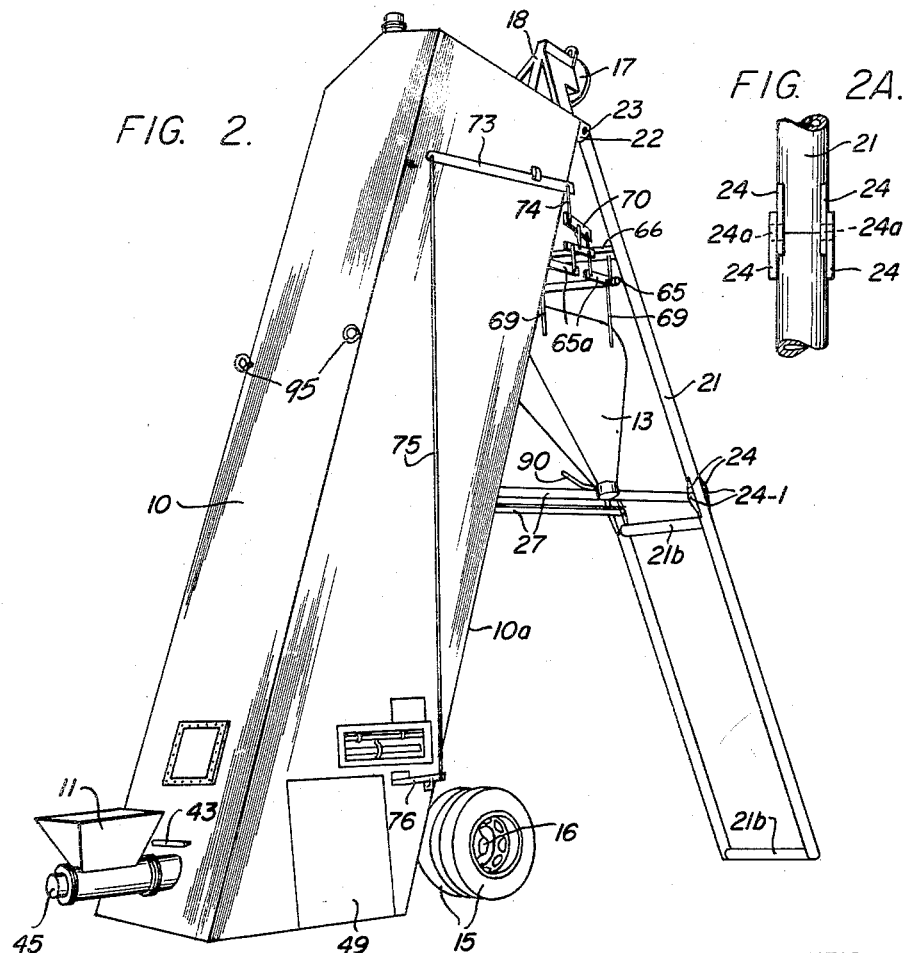
INVENTOR.
ROYAL W. SIMS
ATTORNEYS March 13, 1962 R. W. SIMS 3,024,930
PORTABLE STORAGE AND DISPENSING SILO FOR BULK DRY CEMENT
Filed Oct. 28, 1957 5 Sheets-Sheet 2
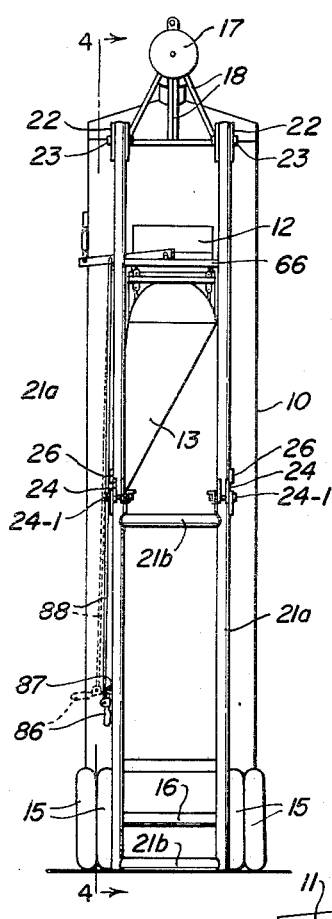
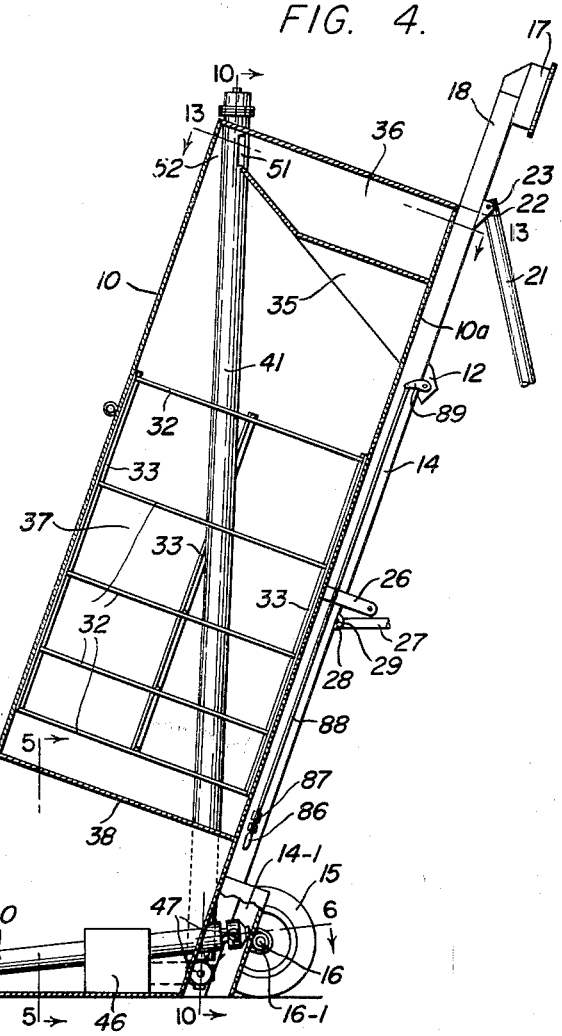
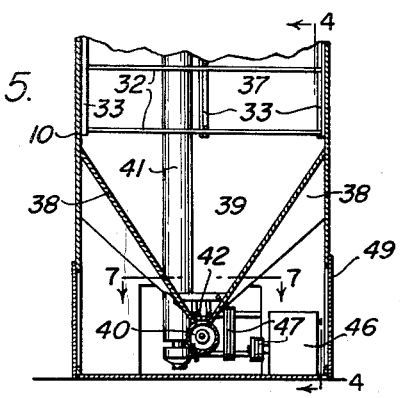
INVENTOR.
ROYAL W. SIMS.
ATTORNEYS March 13, 1962 R. W. SIMS 3,024,930
PORTABLE STORAGE AND DISPENSING SILO FOR BULK DRY CEMENT
Filed Oct. 28, 1957 5 Sheets-Sheet 3
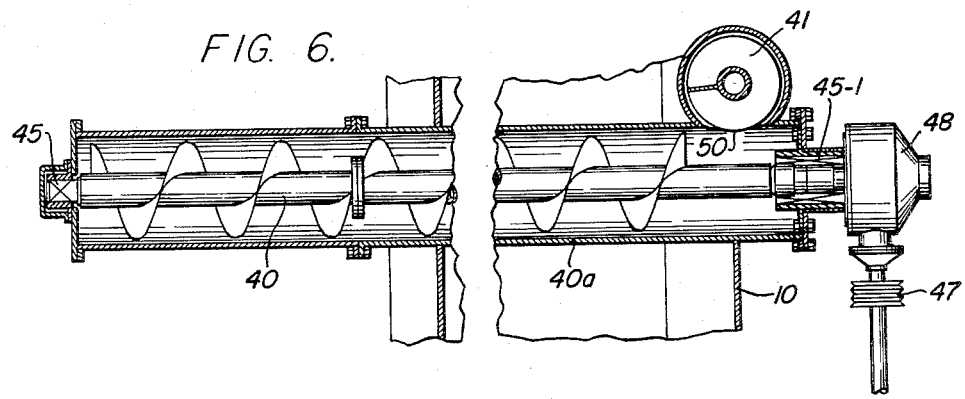
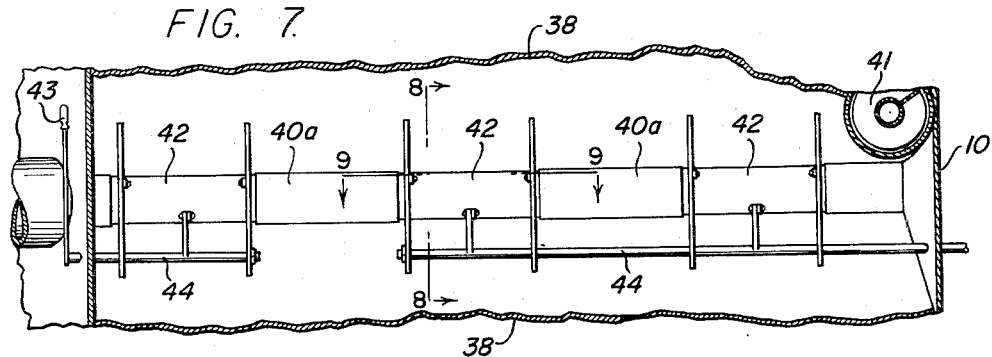
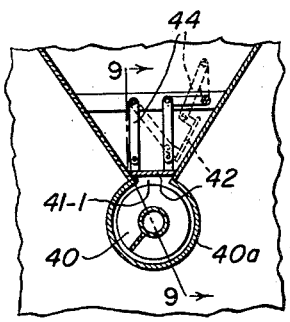 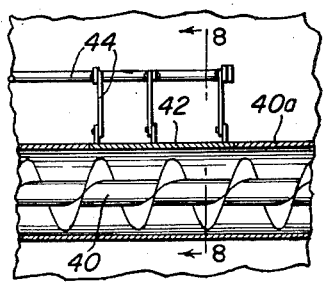
INVENTOR.
ROYAL W. SIMS
ATTORNEYS

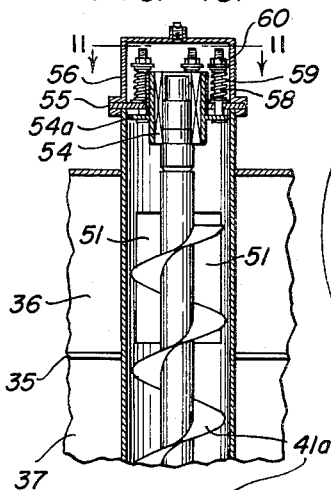
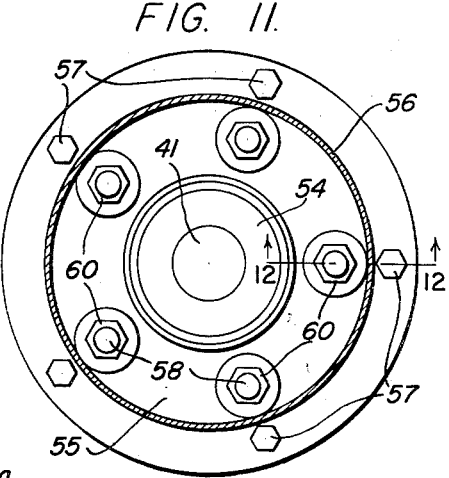
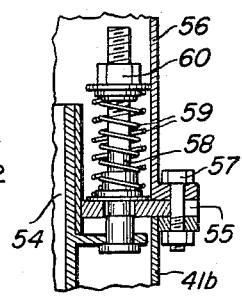
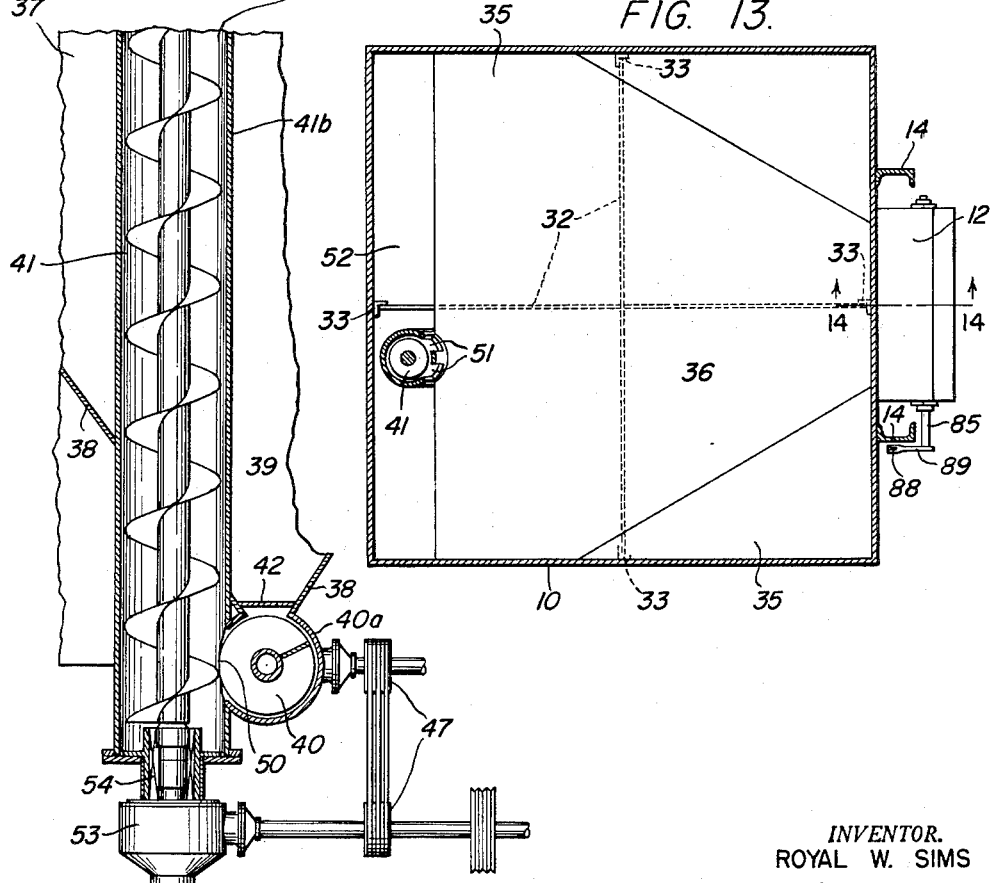

March 13, 1962  R. W. SIMS  3,024,930
PORTABLE STORAGE AND DISPENSING SILO FOR BULK DRY CEMENT
Filed Oct. 28, 1957  5 Sheets-Sheet 5
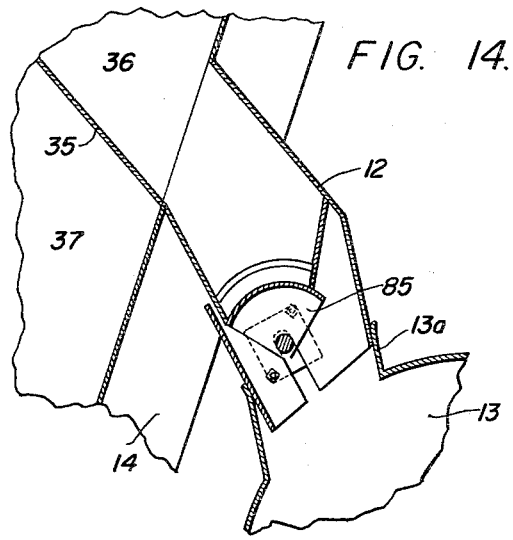
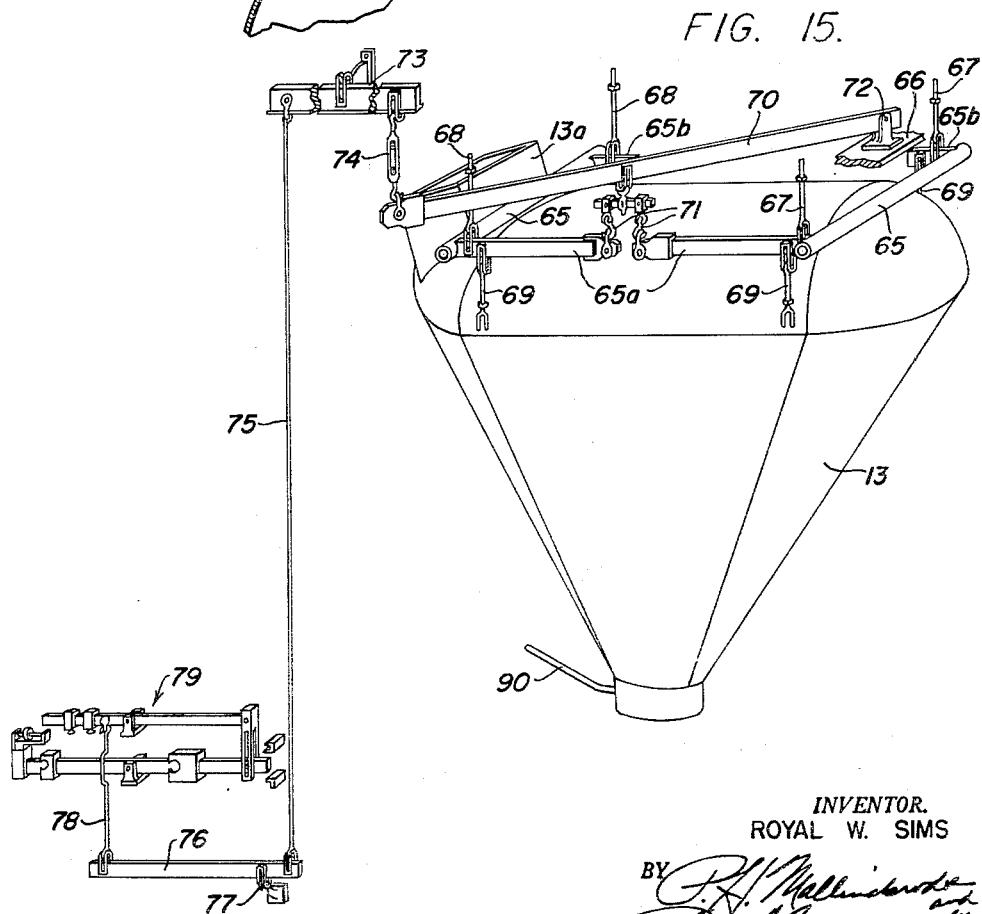
INVENTOR.
ROYAL W. SIMS
ATTORNEYS

# United States Patent Office 3,024,930
Patented Mar. 13, 1962

3,024,930
PORTABLE STORAGE AND DISPENSING SILO
FOR BULK DRY CEMENT
Royal W. Sims, 6450 Holaday Blvd., Salt Lake City, Utah
Filed Oct. 28, 1957, Ser. No. 692,607
2 Claims. (Cl. 214—501)

This invention relates to storage and dispensing equipment for bulk dry material in discrete particle form, especially cement, and is concerned with providing a dispensing silo that can be readily moved from place to place, as for example, to service concrete mixing equipment at or near construction sites.

There has long been a need in the construction industry for bulk dry cement storage and dispensing equipment that can be easily transported from site to site and can be quickly and easily erected and taken down at each site.

Prior to this invention, storage silos have been available for receiving the bulk cement from a transport truck and for elevating it to a weighing hopper as and when required, so that it can be dispensed to concrete batchers or mixers in measured amounts. But such equipment has various disadvantages, and has not come into widespread use. Among the disadvantages is the fact that an undue length of time is required for filling the weigh hopper, thereby slowing the dispensing operation. Moreover, such equipment has no mobility in and of itself, and can be moved from site to site only with considerable difficulty.

Important objects of the present invention are to provide mobile equipment for storing, elevating, weighing, and dispensing bulk dry cement at construction sites or wherever a user may find it handy to charge concrete batchers or mixers, particularly those of transit type, with measured quantities of dry cement; to construct such equipment as a compact, effectively integrated, and protectively housed unit adapted for immediate haulage as a trailer by any standard, automotive, transport tractor; to include in such equipment storage capacity for a substantial quantity of the bulk cement in condition for immediate controlled discharge into a weigh hopper for dispensing in measured amounts; and to provide, in such equipment, screw-conveying mechanism capable of handling very hot cement without difficulty.

Features in the achievement of these objects are the provision of road wheels and a tractor hitch at respectively opposite ends of the silo, so that it becomes, in effect, a transport trailer when in reclining, non-operating position; the provision of an easel support for the silo when the latter is raised to an upstanding position, resting on its end adjacent the road wheels as a bottom; the provision of a supply hopper as a compartment in the silo above the main storage bin and above the weigh hopper, so that a supply of cement is always ready for rapid introduction into the weigh hopper by gravity flow; and the provision of an elevating conveyer screw mechanism capable of accommodating expansion of the conveyor screw when excessively hot cement is being handled.

Further objects and features of the invention will become apparent from the following detailed description of the presently preferred embodiment illustrated in the accompanying drawings.

In the drawings:

FIG. 1 represents a side elevation of the silo in reclined, transport position as attached to a standard automotive tractor unit for haulage to an erection site;

FIG. 2, a perspective view of the same silo in upright, operating position as erected for use following disengagement from the tractor unit of FIG. 1, this view being drawn to an enlarged scale;

FIG. 2A, a fragmentary rear elevation, illustrating the hinge and locking arrangement for the easel type supporting frame in detail, and on a still more enlarged scale, the hinge and locking pintles having been removed for convenience of illustration;

FIG. 3, a rear elevation of the erected silo of FIG. 2, drawn to a scale between those of FIGS. 1 and 2;

FIG. 4, a longitudinal vertical section taken on the line 4—4 of FIG. 3 (see also 4—4 of FIG. 5) and drawn to approximately the scale of FIG. 2;

FIG. 5, a transverse, fragmentary, vertical section taken on the line 5—5 of FIG. 4 to show the discharge hopper arrangement leading from the main storage bin;

FIG. 6, a fragmentary horizontal section taken on the line 6—6 of FIG. 4 to show the feed screw and its intersection with the elevating screw, this view being drawn to a considerably enlarged scale and an intermediate portion thereof being broken out for convenience of illustration;

FIG. 7, a fragmentary horizontal section taken on the line 7—7 of FIG. 5 and drawn to the enlarged scale of FIG. 6, the view showing details of the discharge valve mechanism between main storage bin and feed screw;

FIG. 8, a fragmentary vertical section taken on the line 8—8 of FIG. 7 (also 8—8 of FIG. 9), the open position of the valve mechanism being shown by dotted lines;

FIG. 9, a fragmentary vertical section taken on the line 9—9 of FIG. 7 (also 9—9 of FIG. 8);

FIG. 10, a fragmentary vertical section taken on the line 10—10 of FIG. 4 to show details of the elevating screw conveyer mechanism, this view being drawn to the enlarged scale of FIG. 6, and an intermediate portion being broken away for convenience of illustration;

FIG. 11, a detail horizontal section taken on the line 11—11 of FIG. 10 and drawn to a still larger scale;

FIG. 12, a fragmentary vertical section taken on the line 12—12 of FIG. 11;

FIG. 13, a horizontal section taken on the line 13—13 of FIG. 4 and drawn to an enlarged scale, this view showing details of the supply hopper serving the weigh hopper;

FIG. 14, a fragmentary vertical section taken on the line 14—14 of FIG. 13 to show details of the valved discharge between supply hopper and weigh hopper; and FIG. 15, an exploded perspective view of the weigh hopper suspension mechanism and the scale mechanism, showing the interrelationship of the two.

Referring to the drawings:

In the construction illustrated, see particularly FIG. 2, the portable silo of the invention comprises a silo structure 10 having a feed or charging hopper 11 for receiving supplies of bulk cement from time to time from a transport truck or other agency and having a discharge spout 12 for discharging given amounts into a weigh hopper 13 as may be required from time to time in the furnishing of measured quantities of cement to concrete mixing equipment, particularly transit mixers. This silo is designed especially for use with the portable batching equipment disclosed in my U.S. Patent No. 2,756,881 issued July 31, 1956 entitled "Batch Loader for Dry-Mix Concrete."

The silo structure 10 stands upright, as in FIG. 2, when in use, but is adapted for transportation from place to place in the reclined position of FIG. 1. To this end, it has an elongate frame 14 rigidly secured to and extending longitudinally along one of its sides 10a, as a chassis for transport purposes.

An undercarriage, made up of road wheels 15 rotatably mounted on an axle 16, is provided at one end of the chassis frame 14, while a tractor hitch 17 is provided at the opposite end. Such tractor hitch is mounted on a draft frame 18, which projects forwardly from chassis frame 14, and is adapted for attachment to a conventional fifth wheel mechanism 19 of any standard automotive tractor unit 20, FIG. 1.

The undercarriage is fastened directly to a depending housing portion made up of a short auxiliary frame members 14—1 welded to main chassis frame 14 and of plates 10—1 welded to the frame extension of the silo walls. U-bolts 16—1 firmly secure axle 16 of the undercarriage to such depending housing.

As so constructed, it can be seen that the silo structure 10 serves in and of itself as a transport trailer unit, being always ready for direct attachment to a standard automotive tractor unit in the usual manner for haulage from one operating site to another.

In its upright operating position of FIG. 2, the silo structure 10 rests upon an end wall 10b, which is preferably disposed at an obtuse angle to side wall 10a, so that such silo structure is inclined to the vertical and enables weigh hopper 13 to be suspended in a most advantageous position, both for receiving cement by gravity flow from the upper part of the silo structure through discharge spout 12 and for dispensing weighed amounts of cement by gravity flow into equipment spotted below.

In order to maintain silo structure 10 in this inclined position, an easel type of supporting frame 21 is hingedly mounted at the forward end of chassis frame 14, as by means of brackets 22 and pivot pins 23.

Such easel frame 21 is of length capable of firmly supporting the silo structure when its end wall or bottom 10b is resting upon level ground or upon some other level supporting surface. It is advantageously made up of two longitudinal sections connected end-to-end, so as to fold together for transport and lock together in extended silo-supporting positions.

In the form illustrated, each of the easel frame sections includes a pair of longitudinal frame members 21a disposed in mutually spaced side-by-side relationship and secured together by cross pieces 21b. As interconnected, adjoining ends of the members 21a of the two sections abut together. They are joined by respective sets of ears 24 projecting outwardly and oppositely from each of the abutting ends of members 21a, the ears of one set overlapping the ears of the adjoining set, see particularly FIG. 2A, and both sets being provided with pin-receiving openings 24a which register when the sections are in the longitudinally aligned, silo-supporting position of FIG. 2. In that position, pins 24—1, extending through the respective sets of registered openings, rigidly lock the two sections together.

To fold the easel frame 21 into collapsed position for transport, it is only necessary to remove pins 24—1 from the overlapped ears at the inner side of such frame and fold the lower section backwardly over the upper section.

In collapsed position, the forward end of the lower frame section is supported by hangers 25, and the rearward hinged ends of both sections are supported by hangers 26.

A pair of braces 27 extends from pivotal attachment to the easel frame, at 28, FIG. 2, to rigid attachment to chassis frame 14, as by means of bolts 29, FIG. 4. In the reclining position of the silo and the collapsed transport position of the easel frame, the braces 27 are swung backwardly on their pivots 28, and their free ends are attached to the undercarriage, as by means of bolting to respective hangers 30, FIG. 1.

For haulage purposes, weigh hopper 13 is disengaged from its suspended position of FIG. 2, and is set on draft frame 18 immediately in advance of the reclined silo structure, as shown in FIG. 1, being secured in place in any suitable manner, for example, by lashings 31.

Silo structure 10 may be braced internally, at least for the larger sizes thereof, by tie bars 32 extending from respective anchorages 33 at one side wall of the silo structure to similar anchorages at the opposite side, see particularly FIG. 13.

Within the silo structure 10 and adjacent to its upper end, hopper-defining, partition walls 35 define a supply hopper 36 immediately above main storage bin 37. Likewise, partition walls 38 define a discharge hopper 39 for such main storage bin at the lower end of the silo and in controlled discharge relationship with a screw conveyor 40, FIG. 5.

Such screw conveyer 40 extends from the feed or charging hopper 11 to material-transfer communication with the lower end of an elevating screw conveyer 41, its tubular casing 40a having valve ports 41—1, FIGS. 5 and 8, at intervals along its length establishing feed communication with the discharge hopper portion 39 of main storage bin 37.

Discharge from such main storage bin into screw conveyer 40 is controlled by a series of elongate plates 42, FIG. 7, manipulated from closed to open positions and vice versa, see FIG. 8, by means of handle 43, FIG. 7, and of operating linkage 44.

The conveyer screw of conveyer 40 may be mounted for rotation in any suitable manner, but is preferably journaled at its opposite ends by respective anti-friction bearings 45 and 45—1, FIG. 6, and is driven by a gasoline engine 46 operating through a belt and pulley drive arrangement 47 and a conventional ring and pinion speed reducer 48, such as a standard Ford truck differential. An access door 49 in silo structure 10 provides access to engine 47 and its associated drive mechanism.

Elevating screw conveyer 41 has its lower end in material-receiving communication with screw conveyer 40 through a transition port 50, FIG. 10, and extends vertically through the inclined silo structure 10 to discharge-communication with both supply hopper 36 and main storage bin 37 through ports 51. In this connection, it should be noted that the bottom wall 35 of supply hopper 36 terminates short of that side wall of the silo structure 10 which lies opposite the discharge spout 12 of such supply hopper, to define a long and relatively narrow opening 52 between the supply hopper and main storage bin at and immediately below the discharge ports 51. In this way, cement being elevated by elevating screw conveyer 41 discharges into supply hopper 36, but, when such supply hopper is full, the discharged cement spills over into the main storage bin through opening 52.

With this arrangement, charging of both the main storage bin 37 and the supply hopper 36 is accomplished by screw conveyer 40 and elevating conveyer 41. Both are charged initially by introduction of material into charging hopper 11 while conveyer valve plates 42 are in closed position. Following the filling of the main storage bin, supply hopper 36 may be refilled time and time again from such bin by operating conveyers 40 and 41 with conveyer valve plates 42 in open position.

Conveyer screw 41a of elevating conveyer 41 is journaled at its lower end upper ends in respective anti-friction thrust bearings 54, and is driven by engine 46 through the belt and pulley drive arrangement 47 and its own speed reducer 53.

It is a feature of the invention that the upper bearing 54 is mounted for limited movement axially of the conveyer screw 41a, so that such screw is free to expand and contract without lateral buckling and the possibility of binding against the conveyer casing 41b. The construction employed for this purpose is believed to be new in and of itself and to constitute inventive subject matter in its own right as well as in the instant combination.

In the particular form illustrated, see FIGS. 10–12, the upper bearing 54 extends through and is slidable in the central aperture of an annular plate 55, which is interposed between the outwardly flanged upper end of the casing 41b of screw conveyer 41 and a similarly flanged, protective cap 56, both plate and cap being tightly secured to the conveyer casing by means of bolts 57, FIG. 11.

Bearing 54 is externally flanged at 54a, such flange carrying in rigid securement thereto upstanding studs 58 which pass slidably through respective receiving apertures provided in plate 55. Thus, bearing 54 and its studs 58 are free to move up and down relative to conveyer casing 41b, plate 55, and cap 56 as and when conveyer screw 41a expands or contracts.

Sets of coil springs 59 encircle the respective studs 58, and are compressed against plate 55 by nuts 60 screwed onto the threaded ends of the respective studs against the urge of such springs. It is advantageous that the nuts be tightened to prestress the conveyer screw with a load of approximately 1500 lbs. This eliminates any possibility of the long conveyer screw buckling under load. Moreover, extremely hot cement, picked up from a cement plant shortly after being made and before it has time to cool, can be handled with no chance of the conveyer screw buckling due to heat expansion, since any expansion will be accommodated by its aforedescribed upper end mounting.

The weight hopper 13 is hung from the set-up silo so that its feed chute 13a, FIGS. 14 and 15, receives silo discharge spout 12 in inset relationship, see especially, FIG. 14. It is suspended in position by a system of weighing levers common in hanging scale construction.

As illustrated, FIG. 15, such system includes a pair of main levers 65, one of which is fastened to a cross-piece 66 (rigidly fastened to the upper section of easel frame 21) by means of hangers 67, and the other of which is suspended from chassis frame 14 by hangers 68. Hangers 69 attach weigh hopper 13 to respective lever arms 65a and 65b of such main levers 65.

Levers 65 are connected to a first extension lever 70 by means of a nose iron hanger assembly 71 associated with lever arms 65a, and such extension lever 70 is pivotally supported by cross-piece 66 on a bearing stud 72 attached thereto. Its other end is connected to one end of a second extension lever 73 by a turnbuckle hanger 74, and the opposite end of such second extension lever is connected by a long draft rod 75 to one end of a shelf lever 76, which is fulcrumed on a support hook 77 secured to silo structure 10. The opposite end of shelf lever 66 is connected by a rod 78 to a standard type of beam scale 79 protectively housed within the silo structure.

Controlled discharge of cement from supply hopper 36 into weigh hopper 13 is effected by a gate valve mechanism 85, FIG. 14, which is manually actuated by a conveniently located handle 86 having a leverage connection 87 with a draft rod 88 extending to pivotal connection with an actuating arm 89, FIG. 13, of such gate valve mechanism.

Discharge of respective weighed quantities of cement from weigh hopper 13 is effected by a standard gate valve (not shown) actuated by a handle 90.

It can be seen from the above that the silo of the invention makes for exceptionally speedy handling of concrete mixing operations. It is preferred that supply hopper 36 have a capacity of at least two full weigh-hopper charges, so that an adequate supply of cement will always be ready for introduction into the weigh hopper.

Thus, following the filling of both supply hopper 36 and main storage bin 37 from charging hopper 11 while plate valves 42 are closed, horizontal screw conveyer 40 and vertical elevating screw conveyer 41 are utilized to repeatedly re-fill the supply hopper from the main storage bin. To accomplish this, it is only necessary to operate such conveyers after plate valves 42 have been opened by appropriate manipulation of handle 43.

The silo may be quickly and easily set up into operating position from its reclined transport position by exerting strong pull on cables (not shown) attached to rings 95, FIGS. 1 and 2, on the silo structure. The necessary strong pull may be had by utilizing various types of automotive equipment commonly owned by contractors. It is preferred, however, to utilize the portable batching equipment of my aforereferred to Patent No. 2,756,881 for the purpose.

Whereas this invention is here illustrated and described with respect to a particular preferred embodiment thereof, it should be understood that various changes may be made therein without departing from the scope of the following claims.

I claim:

1. A portable storage and dispensing silo for bulk dry material in discrete particle form, comprising silo structure including an elongate silo and an elongate structural frame extending longitudinally with and rigidly secured to one side of said silo as a supporting chassis for transport purposes, said silo having an end forming an obtuse angle with said side; road wheels mounted on the chassis frame adjacent that end thereof which corresponds to said end of the silo; a tractor hitch mounted on said chassis frame at the other end thereof, so that the silo structure may be hauled as a trailer when upset into reclined position from standing position; an easel type of supporting frame pivotally attached to said silo structure at the tractor hitch end thereof so as to swing toward and against said silo structure for transport purposes, the easel frame having length adapted to maintain the silo structure in an inclined, upright position resting on said end of the silo when standing and being made up of two frame sections hingedly attached in end-to-end abutting relationship; and hanger means at the underside of the silo structure for holding said easel frame in collapsed condition against the silo structure during transport; and means adjacent the obtuse angle end of the silo for introducing material into said silo when standing, said silo having a material discharge port in its said side adjacent the tractor hitch end thereof.

2. The silo of claim 1, wherein the two frame sections are attached together by means of respective sets of oppositely directed ears projecting forwardly and rearwardly with respect to the silo structure, the corresponding ears of adjoining sets mutually overlapping and being provided with registering pin-receiving openings, and pins removably received by respective sets of the said registering openings in the set-up position of said frame for both locking and hinging said frame sections relative to each other.

References Cited in the file of this patent

UNITED STATES PATENTS

| | | |
|---|---|---|
| 1,848,569 | Leggett | Mar. 8, 1932 |
| 2,048,877 | McCrery | July 28, 1936 |
| 2,347,437 | Saxe | Apr. 25, 1944 |
| 2,487,343 | Kopf | Nov. 8, 1949 |
| 2,524,948 | Whitney | Oct. 10, 1950 |
| 2,528,679 | Ballard | Nov. 7, 1950 |
| 2,679,322 | Martinson | May 25, 1954 |
| 2,694,496 | Atkinson | Nov. 16, 1954 |
| 2,701,653 | Gilson | Feb. 8, 1955 |
| 2,739,804 | Funderburk | Mar. 27, 1956 |
| 2,880,890 | Stuller | Apr. 7, 1959 |
| 2,886,189 | Funderburk | May 12, 1959 |